(No Model.) 6 Sheets—Sheet 1.

T. COWBURN & F. TENTSCHERT.
BRAKE APPARATUS FOR RAILWAY VEHICLES.

No. 401,694. Patented Apr. 16, 1889.

Witnesses,
Will S. Norton
V. E. Hodges

Inventors,
Thomas Cowburn
Florian Tentschert
by John J. Halstead & Son.
their Attys.

N. PETERS, Photo-Lithographer, Washington, D. C.

(No Model.) 6 Sheets—Sheet 4.

T. COWBURN & F. TENTSCHERT.
BRAKE APPARATUS FOR RAILWAY VEHICLES.

No. 401,694. Patented Apr. 16, 1889.

Witnesses,
Inventors,
Thomas Cowburn
& Florian Tentschert
by John J. Halsted & Son
their Attys.

(No Model.) 6 Sheets—Sheet 5.
T. COWBURN & F. TENTSCHERT.
BRAKE APPARATUS FOR RAILWAY VEHICLES.
No. 401,694. Patented Apr. 16, 1889.
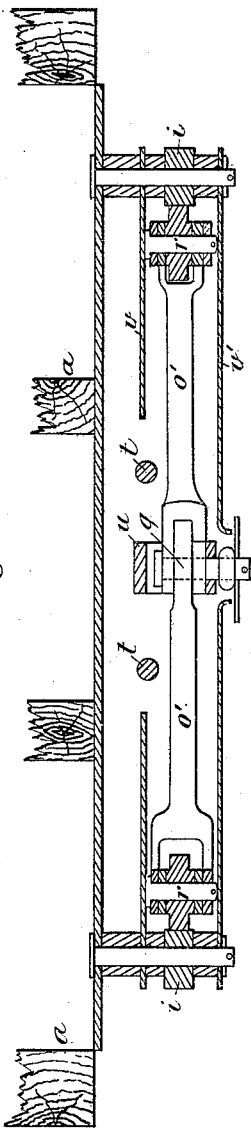
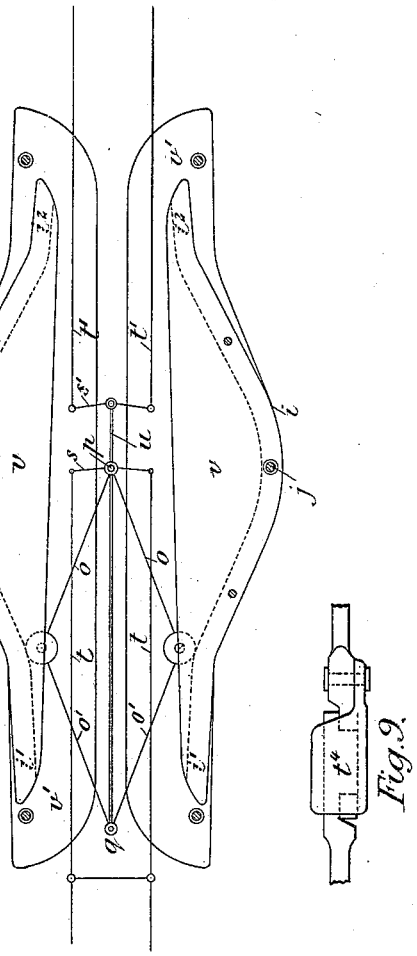
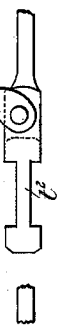
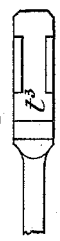
Witnesses. Inventors.

(No Model.) 6 Sheets—Sheet 6.
T. COWBURN & F. TENTSCHERT.
BRAKE APPARATUS FOR RAILWAY VEHICLES.
No. 401,694. Patented Apr. 16, 1889.
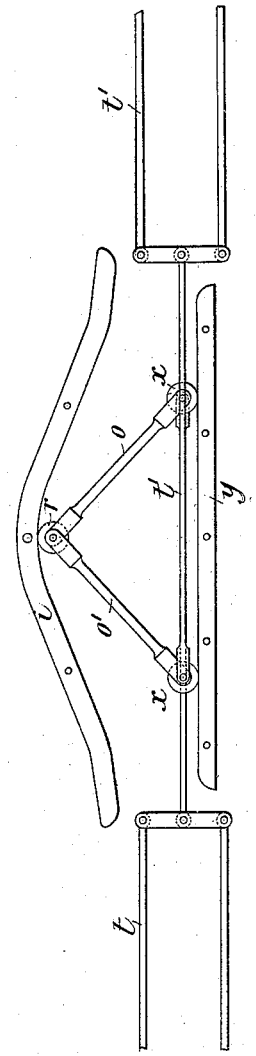
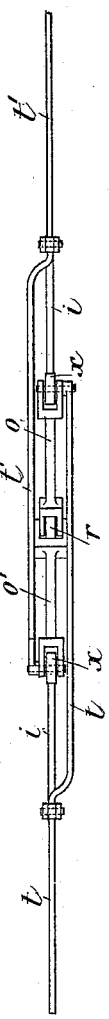
Fig. 11.
Fig. 12.

UNITED STATES PATENT OFFICE.

THOMAS COWBURN, OF MÖDLING, AND FLORIAN TENTSCHERT, OF VIENNA, AUSTRIA-HUNGARY, ASSIGNORS OF ONE-HALF TO ARTHUR CHARLES BONSALL, OF WYLDEWOODS, ENGLAND.

BRAKE APPARATUS FOR RAILWAY-VEHICLES.

SPECIFICATION forming part of Letters Patent No. 401,694, dated April 16, 1889.

Application filed May 28, 1888. Serial No. 275,328. (No model.)

*To all whom it may concern:*

Be it known that we, THOMAS COWBURN, residing at Mödling, in the Empire of Austria-Hungary, and FLORIAN TENTSCHERT, residing at Vienna, in the Empire of Austria-Hungary, both subjects of the Emperor of Austria-Hungary, have invented new and useful Improvements in Continuous-Brake Apparatus for Railway-Vehicles, of which the following is a specification.

Our invention relates to improved continuous-brake apparatus for railway-vehicles; and it comprises the improvements hereinafter described.

Figure 1:
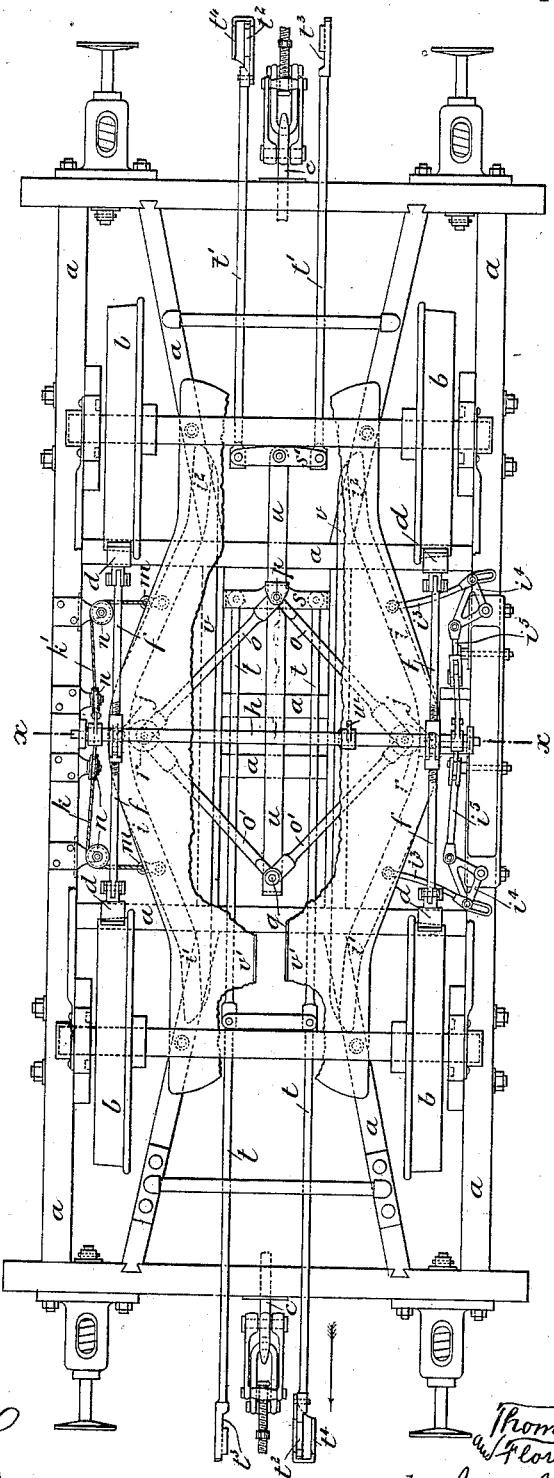
Figure 2:
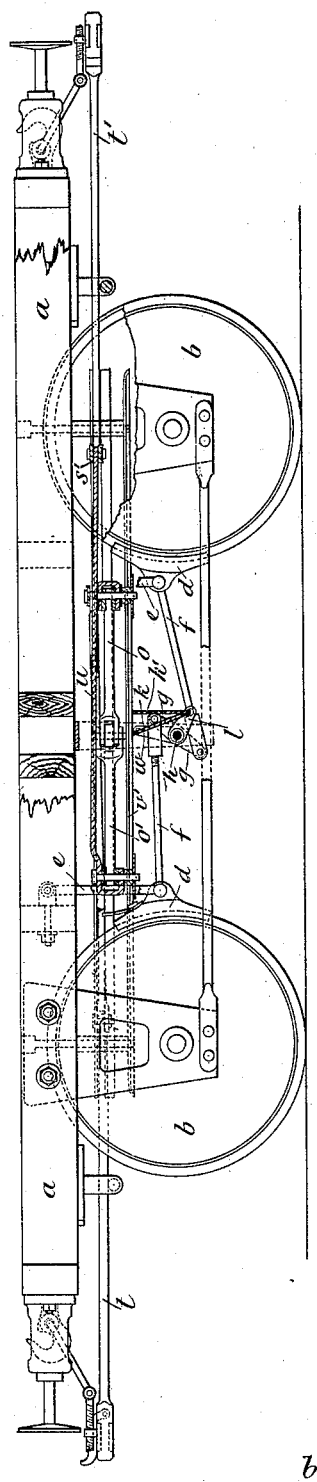
Figure 3:
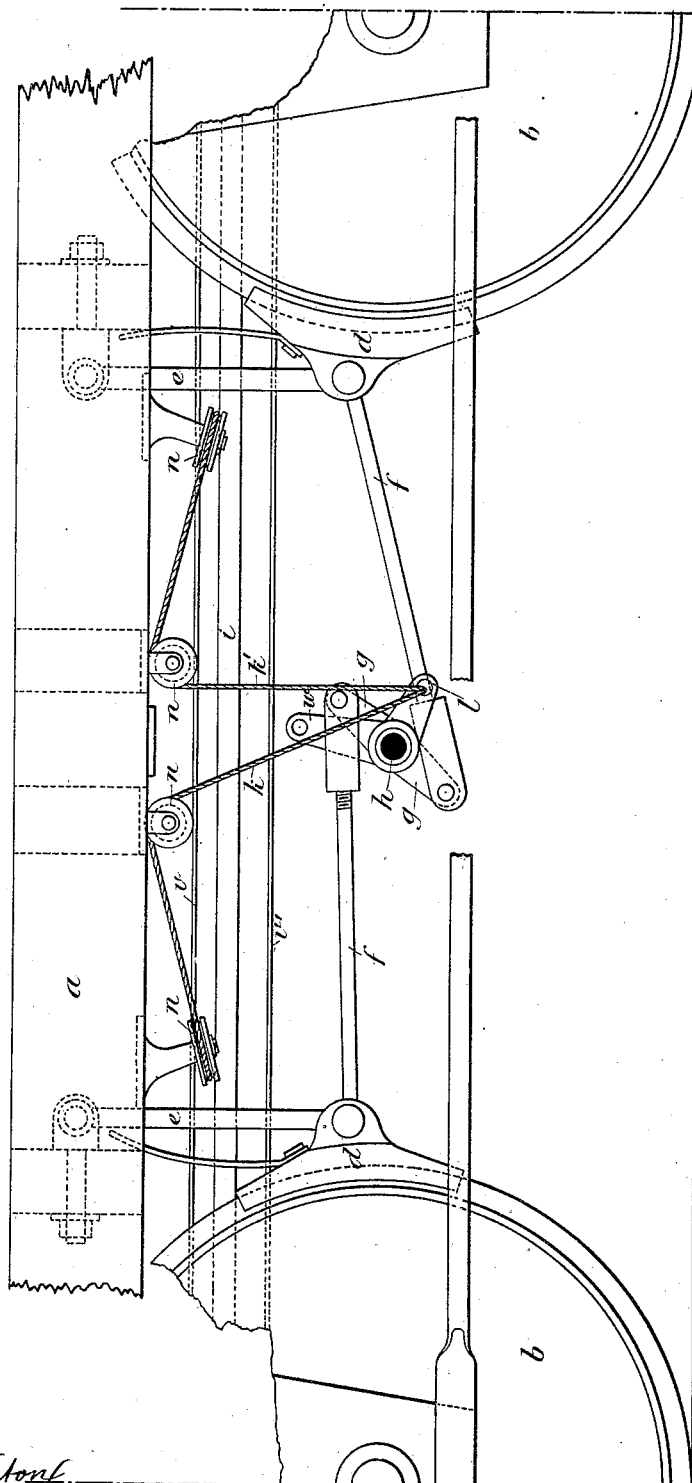
Figure 4:
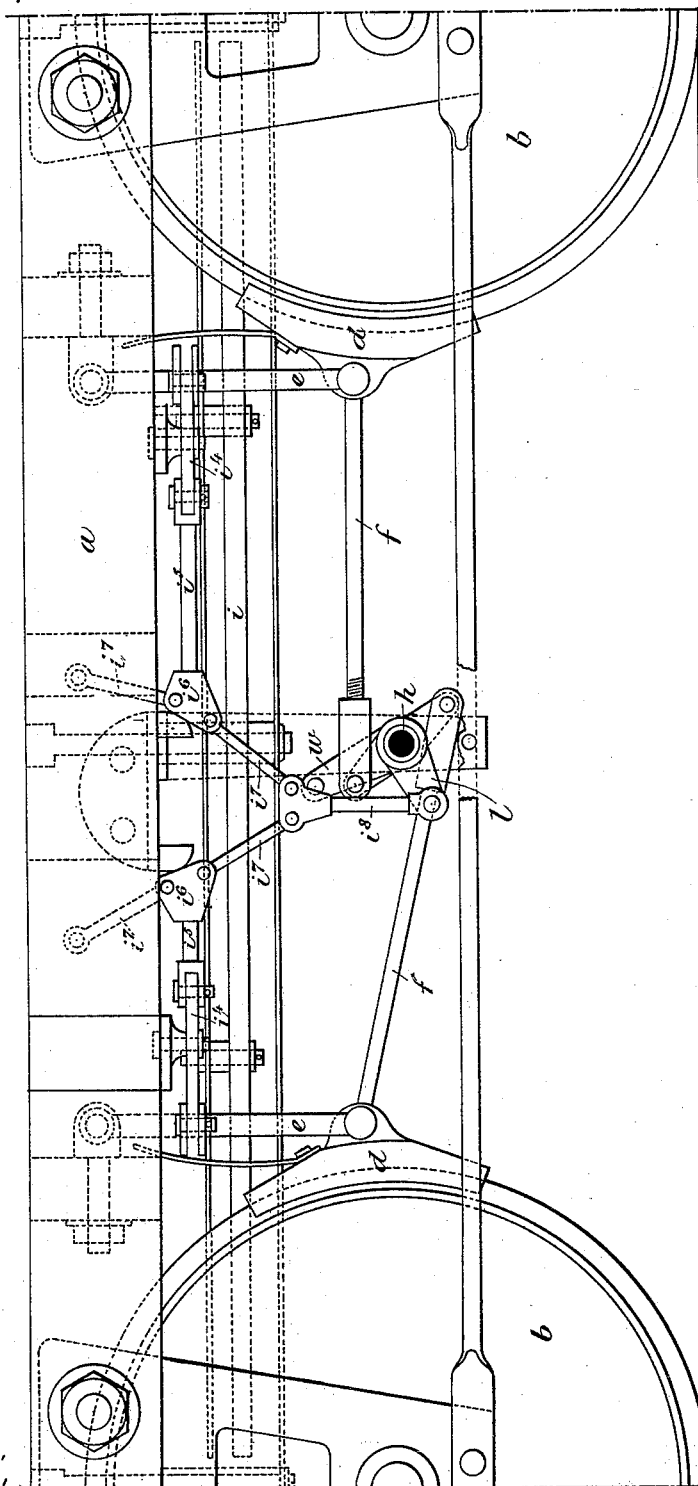

In the accompanying drawings, Figure 1 is an under side view of portions of a railway-vehicle having our improvements applied thereto. Fig. 2 is a sectional side elevation of the same. Fig. 3 is an elevation, drawn to an enlarged scale, of the reverse side of a portion of the vehicle to that shown in Fig. 2. Fig. 4 is a view similar to Fig. 3, but illustrating a modification of our invention. Fig. 5 is a section on the line $x\,x$, Fig. 1, drawn to an enlarged scale. Figs. 6, 7, 8, and 9 are views of details, hereinafter referred to. Fig. 10 is a diagram illustrating the operation of our apparatus. Figs. 11 and 12 are views illustrating another modification of our invention.

$a$ is the frame of the vehicle, $b\,b$ are wheels upon which the same is mounted, and $c\,c$ are draw-bars and couplings for connecting adjacent vehicles together, all the above parts being of any ordinary or suitable construction.

$d\,d$ are brake blocks or shoes, which are supported by links $e\,e$, and connected by rods $f\,f$ to the lever-arms $g\,g$ upon a shaft, $h$, carried in suitable bearings.

$i\,i$ are two bars or levers, pivoted at $j\,j$, and having their ends $i'\,i'$ and $i^2\,i^2$ bent inwardly, as shown in Figs. 1 and 10. Each of these levers is connected by two ropes or chains, $k\,k'$, to an arm, $l$, on the shaft $h$, the said ropes or chains being attached to their respective levers on opposite sides of their pivots, as shown at $m\,m$, Fig. 1, and passing around guide-pulleys $n\,n\,n\,n$, Figs. 1 and 3, so that when the two levers $i\,i$ are moved upon their pivots their motion will be transmitted through one or other of the ropes or chains $k\,k'$ (according to the direction in which the vehicle is traveling) to the arm $l$, and thence through the shaft $h$, the arms $g\,g$, and the rods $f\,f$ to the brake-blocks $d\,d$, to force the same against the wheels.

Instead of employing the ropes or chains $k\,k'$ for transmitting the motion of the levers $i\,i$ to the shaft $h$, we sometimes employ an arrangement of levers illustrated at the lower part of Fig. 1 and in Fig. 4. In this arrangement the said bars or levers $i\,i$ have connected to them links $i^3\,i^3$, which are also attached to bell-crank levers $i^4\,i^4$. The latter are also connected by rods $i^5\,i^5$ to joint-pieces $i^6\,i^6$ between two sets of toggle-bars, $i^7\,i^7$, connected to the frame $a$ and to one end of a connecting-rod, $i^8$, the other end of which is attached to the arm $l$. When the levers $i\,i$ are moved, they act upon one or other of the sets of toggle-bars $i^7\,i^7$, in a well-known manner, to raise the arm $l$ and apply the brake. Any other suitable means may be employed for transmitting the motion of the levers $i\,i$ to the brake-blocks.

$o\,o\,o'\,o'$ are two pairs of bars, which are respectively jointed at $p\,q$, and which are connected together at $r\,r$ to form a parallelogram. This parallelogram is arranged between the levers $i\,i$, and at the lateral angles $r\,r$ is provided with rollers adapted to bear against the said levers.

$s$ is a cross-bar, which is attached to the angle $p$, and which has jointed to its ends two rods, $t\,t$, extending beyond the end of the vehicle, as shown in Fig. 1, and serving for the connection of the brake mechanism of different vehicles.

$t'\,t'$ are two bars similar to the bars $t\,t$, the said bars $t'\,t'$ being jointed to a cross-bar, $s'$, which latter is connected to the angle $q$ of the bars $o'\,o'$ by a rod, $u$. The ends of the rods $t\,t$ and $t'\,t'$ are so formed that they can be readily connected to and disconnected from the corresponding bars, $t'\,t'$ and $t\,t$, respectively, of adjacent wagons, in order that the said rods may form a continuous connection throughout the length of a train.

Figs. 6 and 7 show in side elevation the ends of two adjacent bars adapted to be connected, the solid part $t^2$ of one being adapted to fit into a recess, $t^3$, in the other, as shown in Fig. 8.

$t^4$ is a hinged cap adapted to close over the bars after they have been united, as shown in Fig. 9, which represents in plan two bars coupled together.

The operation of our improved apparatus is as follows—that is to say, the rods $t\,t\,t'\,t'$ of a series of carriages are connected, and the rods $t\,t$ of the foremost carriage are united by any suitable means to the rod of a piston working in a cylinder upon the locomotive, so that when steam is introduced into the said cylinder the rods $t\,t$ will be drawn forward in the direction of the arrow, Fig. 1. The motion of the rods $t\,t$ is communicated to the rods $t'\,t'$, (through the medium of the cross-bar $s$, the pairs of bars $o\,o\,o'\,o'$, the rod $u$, and the cross-bar $s'$,) and thence to the rods $t\,t$ of the adjacent carriage, and so on throughout the length of the train. As the bars $o\,o\,o'\,o'$ are moved forward, their rollers act upon the inclined ends $i'\,i'$ of the levers $i\,i$ to separate the same, so that the opposite ends $i^2\,i^2$ of the said levers act upon the ropes $k'$ or their equivalents to apply the brake-blocks, as hereinbefore described.

From the foregoing description it will be noticed, first, that the bars $o\,o\,o'\,o'$ are jointed and form a parallelogram, and, secondly, that the connecting-rods $t\,t\,t'\,t'$ are respectively connected thereto at the point most remote from the end of the vehicle from which they project. The object of the first part of this arrangement is to allow the rollers to move more or less relatively to the levers $i\,i$, for instance, as shown in Fig. 10, to compensate for any variation of the distance between the various vehicles, and of the second part to maintain the rollers at the angles $r\,r$ always in contact with the levers $i\,i$, whatever may be the position of the former relatively to the said levers, as during the operation of the apparatus the points $p\,q$ have a tendency to move toward each other and to force the rollers against the levers, the pull of the rods at the forward end of the vehicle being on the rear angle of the parallelogram and the resistance offered by the rear rods on the forward angle of the parallelogram.

The rods $t'\,t'$ of the last carriage of a train are prevented from moving forward more than sufficient to operate the levers $i\,i$ by means of a rope or chain secured to the said rods and to the frame of the vehicle; or any other suitable means may be employed for the purpose.

It will be obvious that the operation of our apparatus will be the same in whichever direction the vehicles may be running.

$v\,v\,v'\,v'$ are plates between which the bars of the parallelogram work, the former being preferably attached to the levers $i\,i$ and moving therewith.

$w$ is an arm attached to the shaft $h$, and to which suitable rods and levers may be connected for operating the apparatus independently of the levers $i$.

In cases where it is unnecessary to provide a carriage or other vehicle with brakes the levers $i\,i$ and their connected parts can be stationary, the rods $t\,t'$ and the parallelogram enabling the rods $t\,t'$ of carriages provided with brakes to be connected so as to make a continuous connection throughout the length of a train.

In the modification of our invention shown in Figs. 11 and 12 only two bars, $o\,o'$, are employed, which are connected with the rods $t\,t'$ in the same manner as the pair of bars hereinbefore described, and form what we term a "half-parallelogram." $x\,x$ are rollers at the ends of the bars $o\,o'$, and $y$ is a guide-bar, against which the said rollers bear to prevent them from moving laterally when the roller $r$ is in contact with the lever $i$. It will be understood that with this modification one lever $i$ and its connected parts are dispensed with.

Having now particularly described and ascertained the nature of our said invention and in what manner the same is to be performed, we declare that what we claim is—

1. In continuous-brake apparatus for railway-vehicles, a lever or levers having inwardly-curved ends pivoted centrally and beneath the vehicle, and connected with the brake-blocks, as set forth, either arm respectively of the lever being similarly and equally acted upon, and whereby, when moved upon such central pivot or fulcrum, its motion will be transmitted through its connections (according to the direction in which the vehicle is traveling) to the brakes.

2. The combination, with a pivoted lever or levers, $i$, pivoted beneath the vehicle and arranged in connection with the brake-blocks, of a series of bars jointed together in the form of a parallelogram or half-parallelogram, the lateral angles or angle of which are or is adapted to bear upon the pivoted levers or lever, while the other angles are respectively connected with rods extending through the end of the vehicle most remote therefrom, substantially as and for the purpose specified.

3. In continuous-brake apparatus for railway-vehicles, a series of bars jointed together in the form of a parallelogram or half-parallelogram, in combination with push-rods extending through the ends of the vehicle and respectively connected with the angle of the parallelogram or half-parallelogram most remote from the end of the vehicle through which they extend, substantially as and for the purpose described.

4. The improved means for uniting the ends of the adjacent connecting brake-rods, consisting of the two bars, the one having a solid part, $t^2$, and the other having a recess, $t^3$, into which said solid part is adapted to fit, combined with a hinged cap, $t^4$, adapted to close over the bars after they have been united.

5. In combination with a fixed guide-bar, $y$, and lever $i$, a half-parallelogram, $o\ o'$, connected to rods $t\ t'$, the combination being and operating as set forth.

6. The described improved continuous-brake apparatus, consisting of the following elements in combination, namely: brake-blocks $d$, rods $f$, lever-arms $g$, arm $u$, shaft $h$, lever-bars $i$, having inwardly-bent ends, ropes or chains $k\ k'$, or their described equivalents, arm $l$, guide-pulleys $n\ n$, bars $o\ o'$, cross-bar $s$, rods $t\ t'$, and cross-bar $s'$.

THOMAS COWBURN.
FLORIAN TENTSCHERT.

Witnesses:
EDMUND JUSSEN,
OTTO SCHIFFER.